United States Patent Office 2,856,380
Patented Oct. 14, 1958

2,856,380

SOIL STABILIZATION

Roy W. Roth, Stamford, Abbott M. Swift, Noroton, and David H. Rakowitz, Riverside, Conn., assignors to American Cyanamid Company, New York, N. Y., a corporation of Maine No Drawing. Application May 14, 1956
Serial No. 584,475

10 Claims. (Cl. 260—41)

The present invention relates to methods for the stabilization of soils with polymeric material and more particularly to the process of controlling polymerization of soil stabilizing polymerizable substances in the presence of natural soils to a state wherein the treated soil is substantially non-dispersible in water. The convertible compositions of the invention contemplate between about 3 and about 200 parts by weight of soil to 1 part of a water-soluble copolymerizable mixture containing between about 0.005 and about 0.2 part of one or more selected alkylidene bisacrylamides and one or more selected ethylenic monomers.

In soil stabilization, the product applied to the soil should preferably be in a form permitting easy application thereof to the soil. For example, it may be a substantially non-viscous liquid that can be pumped into soil as a grout, i. e., a thin slurry or solution which on injection into permeable soils inhibits water permeations; or it may be in a solid pulverant form which may readily be evenly distributed upon, or mixed with, the soil, dissolved and thereafter polymerized in the soil.

The chemical reactions or polymerizations of these materials are generally sensitive to variables, such as the temperature, pH, and the influence of other chemicals that may be present. Ideally, a system or material is desirable which will work effectively in a variety of soils which may vary widely in chemical composition and in pH and which may be employed with a minimum change in formulation.

Soils possess at least two other variables which require study with respect to the employment of stabilizers. Soils vary greatly in permeability, and for example, a grouting solution is of little value if it cannot be easily applied, e. g., injected into a site; sprayed in solution form; or easily blended, usually in dry form, into the soil requiring treatment. Secondly, the use of stabilizer solutions in a form no more viscous than water is helpful, since they can be pumped into or applied to any soil through which water can pass.

However, provisions must be made when treating porous soils or gravels to avoid loss of the stabilizer by too rapid permeation whereby the solution before it can set passes right through the strata sought to be stabilized. Accordingly, control of polymerization times in the stabilization or impermeabilization of soil is important, otherwise in various applications, e. g., in grouting dams and levees, foundations, tunnels, mine shafts, and around some excavations stabilization procedures may not be practical. The soil stabilizing materials with which this invention is concerned are copolymers of alkylidene bisacrylamides and an ethylenic copolymer, each of which is hereinafter more fully described.

An effective stabilization treatment involves the incorporation in the soil of a polymerizable material which is capable not only of being timely solidified by polymerization but at the same time forming an integral structure with soil particles rather than merely be mixed with the soil as in the case of an inert filler.

It is accordingly an object of the instant invention to provide a process for the improved stabilization of soils. More particularly, it is the object of the present invention to effect control of the rate of polymerization of soil stabilizer of the type described hereinbefore by utilization of metallic ions as polymerization activators which function as reducing agents. The cations which have been found effective are those of metals having more than one valence state and being in their lowest valence state. As such are the metals copper, iron and tin.

Use of these metallic ion activators in soil stabilization reactions has been found to be an effective means of fixing the position of gel, securing polymerization in dilute solutions, and counteracting the inhibiting effect of the soil.

The control of stabilization reactions of the ethylenic comonomer mixtures of the invention has been found useful, for example, as a means of insuring stabilization in grouting operations employed to seal dams or to waterproof basements, where without some means of securing rapid setting, the solution would drain away before it had time to set. The invention may be usefully employed also, as a means of effecting stabilization from a sprayed or mixed application to soils, to beds of canals and on airports. In this application, the catalyst may be treated before mixing; so that with timing, the wetted front would gel and not penetrate beyond the depth which the solution would fully saturate.

Suitable alkilidene bisacrylamides which are employed as one of the components of the comonomer mixture are such as the monomers described in pending U. S. application Serial No. 528,542, namely those having the formula:

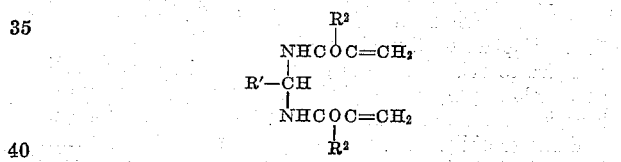

in which

is a hydrocarbon residue of an aldehyde and $R^2$ is of the group consisting of hydrogen and methyl.

The other comonomer is a solid, liquid or gaseous ethylenic compound, i. e., contains at least one $>C=C<$ radical with a solubility of at least about 2% by weight, and preferably at least about 5%, in water and which copolymerizes with the aforesaid bisacrylamide in an aqueous system. Although not essential in practicing the invention, it is preferred to select an ethylenic comonomer that is capable of homopolymerization into polymers which are soluble in water or which are at least self-dispersible in water after appropriate stirring.

The successful use of soil stabilizers frequently depends on being able to control or accelerate the polymerization of the stabilizing material following application thereof to the soil, the ability to exercise this control is frequently of extreme importance if success is to be achieved. For example, particularly in application to large areas and on soil of substantial porosity, unless the polymerization is closely controlled, polymerization may be effected either prematurely, in which case a skin effect will result, greatly diminishing the advantage, or else too much time elapses, in which case the grout solution will have drained from the soil in the area sought to be stabilized. The ability to control polymerization has the advantage of permitting the localized and timely polymerization of the polymerizable material at a time when the polymerizable material is in the best physical relationship with the soil, thereby providing the maximum stabilizing effect.

Any soil may be used as a constituent of the present composition including silt, sands, loams, clays, etc., both naturally occurring and those which have been processed by mining, washing, etc., such as bentonite, kaolinite and the like. Soil mixtures are also within the scope of the invention, including such materials as oil well drilling muds. Thus the term "soil" is used herein in a broad sense and expressions such as "ground" and "earth" are employed to denote the solid surface of the earth and its interior.

Any copolymerizable composition containing an alkylidene bisacrylamide according to the above formula and an ethylenic comonomer of the type described may be employed in practicing the present invention to produce soil masses of decreased water permeability and/or improved load-bearing properties by conversion of the soil composition to a substantially water-impermeable state. This conversion appears to be brought about by an addition or vinyl type polymerization with cross-linking by the bisacrylamide resulting in a three-dimensional structure.

In place of the N,N'-methylene bisacrylamide, hereinafter set forth in the examples, any of the alkylidene bisacrylamides including dimethacrylamides corresponding to the above formula which are described and claimed in Lundberg Patent 2,474,846 or mixtures thereof may be used as comonomer or cross-linking agents. Only slight solubility is required in view of the small amount used; therefore, this component may have a water solubility as low as about 0.02% by weight at 20° C. but a solubility of at least about 0.10% is more desirable for general purposes.

A wide variety of ethylenic comonomers or mixtures thereof are copolymerizable with the alkylidene bisacrylamides; those having at least one $>C=C<$ group hereinafter referred to as the ethenoid group and are appreciably soluble in water are suitable for use in the present invention. The unsubstituted bonds in the formula may be attached to one or more of many different atoms or radicals including hydrogen, halogens such as chlorine and bromine, cyano, aryl, aralkyl, alkyl and alkylene with or without solubilizing groups attached to these hydrocarbons. In addition, the substituents in the ethenoid may comprise one or more hydrophilic groups including formyl, methylol, polyoxyalkylene residues and quaternary ammonium salt radicals

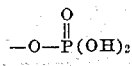

—OOCH, —OOCCH$_3$; —SO$_3$X, where X is H, NH$_4$, an alkali metal or an alkylamine; —CONR$_2$ and

where each R is hydrogen, alkylol, lower alkyl or a polyoxyalkylene radical; and —COOR' and —CH$_2$COOR', where R' is a H, NH$_4$, alkali metal, alkaline earth metal, organic nitrogenous base, alkylol lower alkyl or polyoxyalkylene radical. The water solubility of these substances is known to depend chiefly on the number and type of hydrophilic and hydrophobic radicals to balance any hydrophobic groups present in order to obtain the requisite water solubility of monomer.

Among the water-soluble ethenoid monomers, those containing an acrylyl or methacrylyl group are especially recommended. These are exemplified by N-methylol acrylamide, calcium acrylate, and methacrylamide; and the optimum results have been obtained with acrylamide. Among the other suitable ethenoid compounds are acrylic acid; other N-substituted acrylamides such as N-methyl acrylamide, dimethylaminopropylacrylamide, N-ethylol acrylamide, N-3-hydroxypropylacrylamide; acrylonitrile; saturated alkyl esters of acrylic acid, i. e., methyl acrylate, β-hydroxyethyl acrylate; ethylene glycol and polyethylene glycol acrylates, as exemplified by the reaction product of β-hydroxyethyl acrylate or acrylic acid with about 1 to about 50 mols or more of ethylene oxide; salts of acrylic acid, i. e., magnesium acrylate, sodium acrylate, ammonium acrylate, zinc acrylate, β-aminoethyl acrylate, β-methyl aminoethyl acrylate, guanidine acrylate and other organic nitrogenous base salts, as exemplified by diethylamine acrylate and ethanolamine acrylate; quaternary salts like alkyl acrylamidopropyl dimethylamino chloride; acrolein, β-carboxyacrolein, butenoic acid; α-chloroacrylic acid; β-chloroacrylic acid; as well as methacrylic acid and its corresponding derivatives. Maleic acid and its corresponding derivatives including partial esters, partial salts, and ester salts thereof; maleamic, chloromaleic, fumaric, itaconic, citraconic, vinyl sulfonic, and vinyl phosphonic acids and their corresponding derivatives and mixtures thereof. Such derivatives and other suitable compounds include α,β-dichloroacrylonitrile, methacrolein, potassium methacrylate, magnesium methacrylate, hydroxyethyl methacrylate, zinc β-chloroacrylate, trimethylamine methacrylate, calcium α-chloromethacrylate, diethyl methylene succinate, methylene succindiamide, monomethyl maleate, maleic diamide, methylene malonamide, diethyl methylene malonate, methyl isopropenyl ketone, ethyl vinyl ketone, propyl vinyl ketone, vinyl formate, vinyl lactate, vinyl acetate, vinyl bromoacetate, vinyl chloroacetate, vinyl pyrrolidone, allyl levulinate, allyl alcohol, methallyl alcohol, diallyl carbonate, allyl lactate, allyl gluconate, di(β-aminoethyl)maleate, di(methylaminoethyl)maleate, di(N,N-dimethyl β-aminoethyl)maleate, sulfonated styrene, vinyl pyridine, maleic anhydride, sodium maleate, ammonium maleate, calcium maleate, monopotassium maleate, monoammonium maleate, monomagnesium maleate, methyl vinyl ether, N-aminoethyl maleamide, N-aminoethyl maleimide, alkyl aminoalkyl maleamides, N-vinyl amines, N-allyl amines, heterocyclic ethenoid compounds containing nitrogen in a tertiary amino group, and the amine and ammonium are salts of said cyclid compounds, N-vinyl acetamide, N-vinyl-N-methyl formamide, N-vinyl-N-methylacetamide, N-vinylsuccinimide, N-vinyl diformamide, N-vinyl diacetamide, vinyl sulfonyl chloride, vinyl sulfonic acid salts, vinyl sulfonic acid amides, vinyl oxazolidone, allyl amine, diallyl amine, vinyl methyl pyridinium chloride, and allyl trimethyl ammonium chloride to name only a few of the operative compounds. Compounds of a toxic nature such as monomeric acrylamide should be handled with care.

Polymerization of the vinyl groups of the compounds used in accordance with our invention is effected as heretofore indicated by employing a compound which furnishes metallic ions which may function as reducing agents and which in turn activate rapid (and where desired, instantaneous) polymerization. Water-soluble oxygen-containing catalysts, such as water-soluble peracids and their salts, e. g. the ammonium, potassium and sodium persulfates; hydrogen peroxide, the alkali metal and ammonium chlorates and the like are preferably employed in conjunction with these metallic ion activators. Metallic ions which may be used are the multi-valence type which are in their lowest valence state, i. e., a metal capable of being oxidized to a higher valence such as cuprous, ferrous and stannous.

The invention is not limited to any particular quantity of catalyst, but in general more than about 0.1% catalyst based on the weight of polymerizable monomers is desirable in order to obtain substantially instantaneous polymerization. For best results, the gelatin or polymerization time should be determined on the actual site by mixing one or more small trial batches above the ground where the time can be observed. While core drilling might also be employed for the same purpose in connection with injection treatments, this would be considerably more expensive than the treatment mentioned above. With acrylamide and methylenebisacrylamide as the comonomers and ammonium persulfate as the oxygen-containing component of the catalyst system, it has been found desirable to use between about 0.01% and 7% metallic ion containing compound based on the weight of the polymerizable monomers. It may be desired to employ nonmetallic equipment or equipment having non-metallic coatings or linings to prevent the possibility of clogging, or otherwise obstruction of the operation. While this invention is not bound to any particular theory, it is believed that the solution of polymerizable monomers penetrates into substantially all pores of the soil particles and the exterior voids between the particles and sets to a three-dimensional copolymer. Such copolymers in the soil are equally impermeable to water and other crude petroleum substantially inert liquids, both wet and dry.

The ratio of polymerizable material, which will comprise from about 0.5% to about 20% alkylidene diacrylamide, and preferably about 3% to 10% based on total polymerizable material, to soil may be varied widely, but generally should be within the range of about 3 to about 200 parts by weight of soil to 1 part by weight of polymerizable material. The preferred range is between about 20 and about 100 parts of soil per part of comonomers. Ordinarily, the polymerizable material is dissolved in water to form a solution which is mixed with the soil. The concentration of the solution and the quantity used may be regulated so that the concentration of water in the final mixture of soil and stabilizing components varies anywhere between about 5% and about 70% by weight, depending primarily on the type of soil. Sand, for example, requires much less water than do certain of the clays. The proportion of water used determines to some extent the properties of the resulting stabilized soil. It appears that the optimum conditions for polymerization are realized with at least sufficient water present to saturate the soil, that is, to fill all voids between soil particles and pores therein with the solution of mixed monomers, at the desired degree of compaction when polymerization occurs. The invention, however, is not limited to saturated soil compositions, as substantial advantages are obtained with only partly saturated soil masses.

Compaction or densification of the soil composition helps decrease the water permeability of the resulting product and has an even greater effect in enhancing the strength and load-bearing qualities of the resulting material. These effects may be due entirely or in part to the elimination of voids or air pockets from the soil mass.

The polymerizable material may be incorporated with the soil in any desired manner, as for example, by mixing in a revolving drum. A satisfactory method, for example, comprises premixing the soil and monomer and adding to the mixture a solution of the metallic ion containing catalyst in water. Another method of application which may sometimes be employed is spraying an aqueous solution or dispersion of the polymerizable material onto the ground which it is desired to toughen. This expedient may not result in sufficient penetration in certain soils for some purposes; however, although the difficulty can often be at least partially overcome by plowing the soil either before or after spraying or simultaneously therewith. This can conveniently be done with the "roto tiller" type of plow having revolving tynes which continuously picks up a quantity of soil, thoroughly blends it with the polymerizable material which may contain a component of the catalyst system and returns the blended soil to its place. The soil may then be wetted with a solution containing, for example, copper ion to effect polymerization. For the reason given earlier, the treated soil may preferably be compacted or densified by pressing, tamping, or rolling with a weighted roller prior to polymerization.

Still another method of application which may be employed involves injecting an aqueous solution of the mixed monomers together with a catalyst directly into the ground at the site that is to be stabilized or rendered impermeable to water. For example, an earthen dam may be treated by simply driving perforate injection nozzles or pipes into the side or top of the dam at appropriately spaced intervals without excavating any earth; then an aqueous mixture of the alkylidene diacrylamide and the ethenoid comonomer is pumped into the ground under sufficient pressure to force the mixture out into the soil for a considerable distance from the injection pipe. Introducing the metallic ion at the appropriate time causes immediate gelation. The soil stabilizer of the invention may be employed in various other functions, such as strengthening existing highway and railway road beds against erosion or wash-outs. It is also possible to inject two or three solutions in any order; for example, first a solution containing the catalyst and then the other one or two solutions containing the polymerizable monomers together or separately in such a way that they mix for the first time at the desired location in the ground to be stabilized or impermeabilized.

The compositions disclosed herein may be copolymerized at any temperature ranging from their freezing point up to the point at which any of the constituents decompose.

The present invention is especially useful for sealing porous formations along channels in the earth; for example, in plugging or blocking porous formations in an oil well through which a drilling mud is being expended as lost circulation. This treatment may be practiced in either of two ways. The polymerizable mixture of monomers and the catalyst may be mixed with available soil or spent drilling mud for economy and pumped through the interior of the drill pipe for an appropriate interval; or if voids in the porous formation surrounding the bore are not too large, an aqueous dispersion or solution of the monomeric mixture and the catalyst alone may be pumped through the drill pipe into the porous earth to be sealed. The latter case is analogous to the injection methods described above, whereby two copolymerizable components of the three-component compositions are injected into a fixed body of soil, the third component.

The compositions described herein are also useful in the cementing of liners or casings in channels in the earth; for example, in cementing an oil well casing in place after it has been lowered into the well. This may be accomplished by pumping a slurry of soil (e. g., spent drilling mud), water, monomer mixture and catalyst down the interior of the casing and into the space between the exterior of the casing and the sides of the well. To prevent premature polymerization while the slurry is being put into place in a deep well, the catalyst is omitted from the slurry and later introduced in solution at the bottom of the well to initiate polymerization as it penetrates upwards through the soil mass, or by introducing the catalyst only at the bottom. In the application of sealing porous formation, the compositions of the invention provide particularly advantageous use in sealing quarries or other large earth excavations to be employed as substitutes for expensive storage tanks for the storage of liquids, for example, crude petroleum.

This invention has wide utility for any purpose in which it is desired to stabilize soil that is to cohere and strengthen soil masses, to impart high viscosity, solid or rubber-like properties, to minimize or substantially eliminate the permeability of soil to water and other substantially inert liquids, and to increase the soil's resistance to erosion by moving liquids. The invention described herein may also be employed in providing linings for reservoirs, irrigation ditches, adobe buildings, solid and hollow structural shapes, such as soil bricks, blocks, and pipes which do not require firing or baking for adequate strength. Stabilized soil masses suitable for supporting sizeable loads are usually rigid when dry and upon rewetting often become somewhat flexible or rubbery but do not disintegrate or weaken substantially. In preventing cave-ins and slides and reducing the amount of earth to be removed in excavating operations, the injection method is the simplest manner of forming the soil compositions, and a relatively light treatment at the periphery only of the excavation is recommended in order to avoid hardening the ground to the stage where digging becomes difficult, especially in the center of the excavation where stabilization serves no purpose.

It is important to keep in mind that the soil stabilizers discussed are effective on soils in extremely low concentrations; hence, the economic justifiability for the large-scale application of these additives is based not on the cost of the chemical alone but rather on the cost per unit of soil treated. Also, it will be apparent that unless the polymerization of polymerizable comonomer substances is accurately controlled, what may be estimated as an economically feasible treatment became impractical. For example, a solution containing less than about 15% stabilizer costing in excess of one dollar a pound in its dry form if efficiently employed and timely polymerized, after application on the soil may be economical but if the solution is permitted to drain through the soil to be treated by a large excess with a proportionate increase in cost may be required to provide the desired effect; or with certain soils with rapid drainage, it may be impossible to achieve satisfactory stabilization. It is thus evident that control of polymerization may critically affect the feasibility of soil treatment. The present invention provides suitable control of these polymerizations and provides when desired substantially instantaneous gelation, i. e., fixing of the polymerizable material with soil.

In order to insure sufficient strengthening of any given section of ground for the support of heavy weight, a surface of from about 1½ inches to 6 inches of soil treated according to the process of the present invention should be provided. The actual depth necessary will, of course, vary depending upon how fluid the soil is to begin with or, in other words, how much solidifying is required.

In order that the present invention may be more fully understood, the following examples are set forth for purposes of illustration only, and any specific enumeration of details should not be interpreted as a limitation, except as expressed in the appended claims.

EXAMPLE 1

Into a glass lined vessel 1¾ inches in diameter, was introduced Long Island sand to a depth of 10 inches. Two alternate layers of soil, two inches in depth, contained 0.035 g. CuCl. Into the soil column was poured 200 parts of water containing 20 parts AM–955,[1] 0.2 part ammonium persulfate. The soil sample was extruded from the column. The alternating layers which had contained the cuprous chloride were stabilized and firmly held together, whereas the layers without cuprous chloride easily crumpled. Only the soil containing cuprous chloride was stablized.

[1] AM–955, a comonomer aqueous dispersible mixture comprising about 95% acrylamide and 5% N,N'-methylenebisacrylamide.

EXAMPLE 2

The procedure of Example 1 was employed with a 10% solution of Am–955 and using equal amounts of ammonium persulfate and metallic ion reducing agents. The results of polymerization times to effect gelation are set forth in Table A:

Table A

| Weight Percent Reducing Agent Based on Monomer | $FeSO_4 \cdot 7H_2O$ ($Fe^{++}$) | | $CuCl$ ($Cu^+$) | | $SnCl_2$ ($Sn^{++}$) | | Comparative effect of other reducing agents | | | |
|---|---|---|---|---|---|---|---|---|---|---|
| | | | | | | | $NaHSO_3$ ($-HSO_3$) | | $Na_2S_2O_3$ ($=S_2O_3$) | |
| | Time[1] | Gel | Time | Gel | Time | Gel | Time | Gel | Time | Gel |
| 0.1 | | | 0:30 | Good | | | 35:18 | Good | | |
| 0.15 | 0:51 | Good | | | | | 23:03 | Good | | |
| 0.25 | 0:20 | Good | 0:17 | Good | | | | | | |
| 0.5 | 0:05 | Good | | | 1:17 | Good | | | | |
| 1 | 0:05 | Fair | 0:05 | Fair | | | | | 28:39 | Good |
| 5 | 0:05 | Fair | | | | | | | | |

[1] Times reported as minutes:seconds.

EXAMPLE 3

The procedure of Example 2, soil not included, was followed to determine the effect of monomer ratio and solution concentrations, i. e., a 4% solution AM 955 parts acrylamide—5 parts N,N'-methylene bisacrylamide was compared with a 10% solution of this monomer. The results obtained with $Cu^+$ and $Fe^{++}$ ion as reducing agents in comparison with bisulfite ion are set out in Table B.

Table B

REDUCING AGENT AND CONCENTRATION

| Monomer | | ($Fe^{++}$) 25% Concentration | | ($Cu^+$) 0.25% Concentration | | ($-HSO_3$) 0.25% Concentration | |
|---|---|---|---|---|---|---|---|
| Ratio | Concentration, percent | Time | Gel | Time | Gel | Time | Gel |
| 90:10 | 10 | 0:29 | Fair | 0:15 | Fair | 19:13 | Fair |
| 95:5 | 10 | 0:20 | Good | 0:05 | Good | | |
| 99:1 | 10 | 0:16 | Good | | | 24:47 | Good |
| 90:10 | 4 | 0:25 | Good | | | | |
| 95:5 | 4 | 0:40 | Good | | | | |

We claim:
1. A process for treating soil which comprises applying to soil a polymerizable mixture comprising (a) a monomeric alkylidene bisacrylamide of the formula

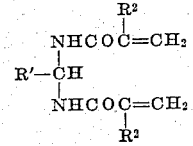

in which

is a hydrocarbon residue of an aldehyde and $R^2$ is of the group consisting of hydrogen and methyl, and (b) another ethylenic monomer, the relative weight of (a) to (b) being within the range of from about 0.005:1 to about 0.2:1, respectively, and the weight ratio of said copolymerizable mixture to soil being from about 1:3 to about 1:200 parts, and converting said soil and mixture to a substantially water-impermeable state by polymerization in the presence of a redox catalyst system comprising an oxidizing agent and from about 0.05% to about 5%, based on the weight of the copolymerizable material, of an oxidizable metallic cation selected from the group consisting of cuprous, ferrous and stannous as reducing agent.

2. A process according to claim 1 in which the alkylidenebisacrylamide comprises N,N'-methylenebisacrylamide.

3. The process of claim 1 wherein the metallic cation is ferrous.

4. The process of claim 1 wherein the metallic cation is cuprous.

5. The process of claim 4 wherein (b) is methylol acrylamide.

6. A process for treating soil which comprises applying to soil a polymerizable mixture comprising (a) N,N'-methylenebisacrylamide and (b) acrylamide, the relative weight of (a) to (b) being within the range of from about 0.005:1 to about 0.2:1, respectively, and the weight ratio of said polymerizable mixture to soil being from about 1:3 to about 1:200 parts, and converting said soil and polymerizable mixture to a substantially water-insoluble state by polymerizing in the presence of a redox catalyst system comprising an oxidizing agent and from about 0.05% to about 5%, based on the weight of the copolymerizable material, of cuprous ion as reducing agent of the catalyst system.

7. The process of claim 6 wherein the reducing agent is the ferrous ion.

8. The process of claim 6 wherein the reducing agent is stannous ion.

9. A process for treating soil which comprises applying to soil a copolymerizable mixture comprising (a) N,N'-methylenebisacrylamide and (b) acrylamide, the relative weight of (a) to (b) being within the range of from about 0.005:1 to about 0.2:1, respectively, and the weight ratio of said copolymerizable mixture to soil being from about 1:3 to about 1:200 parts, and converting said soil and polymerizable mixture to a substantially water-insoluble state by a copolymerizable reaction in the presence of a redox catalyst system comprising from about 0.1% to about 5%, based on the weight of the copolymerizable material, of cuprous ion as reducing agent and ammonium persulfate as the oxidizing agent.

10. A process for treating soil which comprises applying to a soil a coplymerizable mixture comprising (a) N,N'-methylenebisacrylamide and (b) acrylamide, the relative weight of (a) to (b) being within the range of from about 0.005:1 to about 0.2:1, respectively, and the weight ratio of said copolymerizable mixture to soil being from about 1:3 to about 1:200 parts, and converting said soil and polymerizable mixture to a substantially water-insoluble state by a copolymerizable reaction in the presence of a redox catalyst system comprising from about 0.1% to about 5%, based on the weight of the copolymerizable material, of ferrous ion as reducing agent and ammonium persulfate as the oxidizing agent.

References Cited in the file of this patent

UNITED STATES PATENTS

| | | |
|---|---|---|
| 2,601,293 | Howard | June 24, 1952 |
| 2,680,110 | Loughran | June 1, 1954 |

OTHER REFERENCES

Barker et al.: "Impermeabilization of Soils by Injection of Monomers and Polymerization in Situ," 1953.